(12) United States Patent
Hu et al.

(10) Patent No.: US 12,351,669 B2
(45) Date of Patent: Jul. 8, 2025

(54) RESIN COMPOSITION AND APPLICATION THEREOF, BINDER, ELECTRODE SLURRY, ELECTRODE PLATE, BATTERY, AND ELECTRICAL DEVICE

(71) Applicant: CONTEMPORARY AMPEREX TECHNOLOGY (HONG KONG) LIMITED, Hong Kong (CN)

(72) Inventors: Changyuan Hu, Ningde (CN); Lei Lu, Ningde (CN); Yalong Wang, Ningde (CN); Zheng Wang, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 0 days.

(21) Appl. No.: 18/948,956

(22) Filed: Nov. 15, 2024

(65) Prior Publication Data
US 2025/0066517 A1    Feb. 27, 2025

Related U.S. Application Data

(63) Continuation of application No. PCT/CN2022/097335, filed on Jun. 7, 2022.

(51) Int. Cl.
*H01M 4/62* (2006.01)
*C08F 36/06* (2006.01)
(Continued)

(52) U.S. Cl.
CPC ........... *C08F 36/06* (2013.01); *C08K 5/37* (2013.01); *H01M 4/0404* (2013.01); *H01M 4/622* (2013.01)

(58) Field of Classification Search
None
See application file for complete search history.

(56) References Cited

FOREIGN PATENT DOCUMENTS

| CN | 103038224 A | 4/2013 |
|---|---|---|
| CN | 103250273 A | 8/2013 |

(Continued)

OTHER PUBLICATIONS

The World Intellectual Property Organization (WIPO) International Search Report and Written Opinion for PCT/CN2022/097335 Dec. 22, 2022 12 Pages (including translation).

(Continued)

*Primary Examiner* — Tracy M Dove
(74) *Attorney, Agent, or Firm* — ANOVA LAW GROUP, PLLC (57) ABSTRACT

A resin composition includes a main polymer and a crosslinking agent. The crosslinking agent is represented by Formula (A). $Ar_1$ is an aromatic group containing 6 to 50 ring atoms, each $L_1$ is independently selected from one or more of a single bond, a $C_1$ to $C_{50}$ alkylene, or a dynamic covalent bond group, and each $n_1$ is independently selected from integers from 1 to 3. A structural unit of the main polymer contains a structure represented by Formula (1). The main polymer contains no aromatic group.

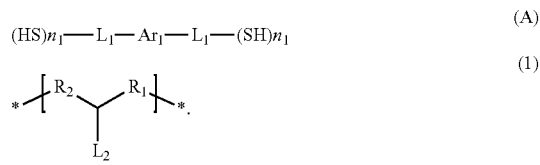

18 Claims, 1 Drawing Sheet

(51) Int. Cl.
*C08K 5/37* (2006.01)
*H01M 4/04* (2006.01)

(56) References Cited

FOREIGN PATENT DOCUMENTS

| | | |
|---|---|---|
| CN | 104137311 A | 11/2014 |
| CN | 107779032 A | 3/2018 |
| CN | 108987751 A | 12/2018 |
| CN | 109921023 A | 6/2019 |
| CN | 111410711 A | 7/2020 |
| CN | 112823176 A | 5/2021 |
| CN | 113652186 A | 11/2021 |
| CN | 113809328 A | 12/2021 |
| CN | 114142039 A | 3/2022 |
| CN | 114479011 A | 5/2022 |
| CN | 114573842 A | 6/2022 |
| JP | 2010287446 A | 12/2010 |

OTHER PUBLICATIONS

Jiawei Li et al. "Hydroxyl-Terminated Polybutadiene-Based Polyurethane with Self-Healing and Reprocessing Capabilities," ACS Omega, No. 7, Mar. 15, 2022, ISSN: 2470-1343, pp. 10156-10166.
Antoine Breuillac et al. "Polybutadiene Vitrimers Based on Dioxaborolane Chemistry and Dual Networks with Static and Dynamic Cross-links," Macromolecules, No. vol. 52, Sep. 12, 2019, ISSM: 0024-9297, pp. 7102-7113.

RESIN COMPOSITION AND APPLICATION THEREOF, BINDER, ELECTRODE SLURRY, ELECTRODE PLATE, BATTERY, AND ELECTRICAL DEVICE

CROSS-REFERENCE TO RELATED APPLICATION

This application is a continuation of International Application No. PCT/CN2022/097335, filed on Jun. 7, 2022, the entire content of which is incorporated herein by reference.

TECHNICAL FIELD

This application relates to the field of batteries, and in particular, to a resin composition and application thereof, a binder, an electrode slurry, an electrode plate, a battery, and an electrical device.

BACKGROUND

A lithium-ion battery is characterized by excellent cycle performance, excellent safety performance, cost-effectiveness, environment-friendliness, and the like, and is a hot topic of concern in the field of new energy. With the development of science and technology, in order to meet the trend of miniaturization, light weight, and thinness of various electrical devices and increase the driving range of electric vehicles, the requirement on the cycle life of lithium batteries is increasingly higher.

In conventional technology, the cycle life of a lithium battery is typically improved by increasing the loading amount of an active material on the electrode plate. A specific preparation process is: coating a current collector with an electrode slurry containing the active material, and then drying the slurry to make an electrode plate. Increasing the coating thickness can increase the loading amount of the active material on the resulting electrode plate. However, during the drying, the volatilization of the solvent gives rise to a stress inside the electrode plate. The cohesive force provided by constituents of a binder in the electrode slurry is not enough to withstand the stress, thereby causing the electrode plate to crack. Especially when the coating is thick, the electrode plate is prone to crack, thereby contrarily causing an adverse effect onto the cycle stability of the battery. In addition, repeated charging and discharging of the battery give rise to change in the volume of the active material, and lead to insufficient adhesiveness or cohesion of the electrode plate, thereby disrupting the structure of the electrode plate, and reducing the cycle stability of the lithium battery.

SUMMARY

In view of the above problem, this application provides a resin composition and application thereof, a binder, an electrode slurry, an electrode plate, a battery, and an electrical device. The resin composition can improve the adhesion and stability of the binder. When used for preparing an electrode plate, the resin composition can improve the stability and crack resistance of the electrode plate, thereby improving the cycle stability of the battery.

According to a first aspect, this application provides a resin composition. The resin composition includes a main polymer and a crosslinking agent. The crosslinking agent is represented by Formula (A):

$$(HS)_{n_1}\text{-}L_1\text{-}Ar_1\text{-}L_1\text{-}(SH)_{n_1} \quad (A)$$

In the formula above, $Ar_1$ is an aromatic group containing 6 to 50 ring atoms, and each $L_1$ is independently selected from one or more of a single bond, a $C_1$ to $C_{50}$ alkylene, or a dynamic covalent bond group.

Each $n_1$ is independently selected from integers from 1 to 3.

A structural unit of the main polymer contains a structure represented by Formula (1), and the main polymer contains no aromatic group:

(1)

In the formula above, $R_1$ and $R_2$ each are any one independently selected from a single bond, a substituted or unsubstituted $C_1$ to $C_{15}$ alkylene, a substituted or unsubstituted $C_2$ to $C_{15}$ alkenylene, or a substituted or unsubstituted $C_2$ to $C_{15}$ alkyl ether group.

$L_2$ is a substituted or unsubstituted $C_1$ to $C_{20}$ hydrocarbon group, and the hydrocarbon group contains an olefinic bond and/or an acetylenic bond.

* is a linking site.

In the above resin composition, the main polymer contains no aromatic group, and the structural unit contains the structure represented by Formula (1), thereby allowing the polymer molecular chain to rotate easily, and enhancing the flexibility of the molecular chain, and in turn, increasing the adhesion of the resin composition. In addition, the micromolecular crosslinking agent contains an aromatic group and two or more thiol groups. The main polymer and the crosslinking agent can stably coexist at normal temperature. Under conditions such as heating, the thiol group in the crosslinking agent can react with the olefinic bond and/or acetylenic bond in the main polymer to form a carbon-sulfur single bond, so as to crosslink the resin composition to form a crosslinked resin that assumes a three-dimensional network structure. The aromatic group in the micromolecular crosslinking agent can further improve the cohesion of the three-dimensional network structure. When used as a binder to prepare an electrode plate, the resin composition can maintain high adhesion to the active material and the current collector in the electrode plate. The resin composition is of both high stability of adhesion and excellent cohesion, and can improve the crack resistance of the electrode plate and effectively suppress the volume change of the active material during charge-discharge cycling, thereby improving the cycle stability of the battery.

According to a second aspect, this application provides a crosslinking resin. The crosslinking resin assumes a three-dimensional network structure formed by linking the main polymer and the crosslinking agent in the resin composition in the first aspect through a crosslinking site, the crosslinking site includes a carbon-sulfur single bond formed by an unsaturated bond in the main polymer and a thiol bond in the crosslinking agent. The unsaturated bond is selected from an olefinic bond and/or an acetylenic bond.

According to a third aspect, this application provides application of the resin composition in the first aspect in preparing a binder.

According to a fourth aspect, this application provides a binder. The binder includes the resin composition disclosed in the first aspect.

According to a fifth aspect, this application provides an electrode slurry. Constituents of the electrode slurry include a solvent and the resin composition disclosed in the first aspect.

According to a sixth aspect, this application provides an electrode plate. The electrode plate includes a current collector and an active layer carried on the current collector. Constituents of the active layer include the crosslinking resin disclosed in the second aspect.

According to a seventh aspect, this application provides an electrode plate. The electrode plate includes a current collector and an active layer carried on the current collector. The active layer is prepared from a raw material including the resin composition disclosed in the first aspect.

According to an eighth aspect, this application provides a battery. The battery includes the electrode plate disclosed in the sixth aspect or the seventh aspect.

According to a ninth aspect, this application provides an electrical device. The electrical device includes the battery disclosed in the eighth aspect.

The foregoing description is merely an overview of the technical solutions of this application. Some specific embodiments of this application are described below illustratively to enable a clearer understanding of the technical solutions of this application, enable implementation of the technical solutions based on the subject-matter hereof, and make the foregoing and other objectives, features, and advantages of this application more evident and comprehensible.

BRIEF DESCRIPTION OF DRAWINGS

By reading the following detailed description of exemplary embodiments, a person of ordinary skill in the art becomes clearly aware of various other advantages and benefits. The drawings are merely intended to illustrate the exemplary embodiments, but not to limit this application. In all the drawings, the same reference numeral represents the same component. In the drawings.

LIST OF REFERENCE NUMERALS

1 battery; 2 electrical device.

DETAILED DESCRIPTION OF EMBODIMENTS

Some embodiments of the technical solutions of this application are described in detail below with reference to the drawings. The following embodiments are merely intended as examples to describe the technical solutions of this application more clearly, but not intended to limit the protection scope of this application.

Unless otherwise defined, all technical and scientific terms used herein bear the same meanings as what is normally understood by a person skilled in the technical field of this application. The terms used herein are merely intended to describe specific embodiments but not to limit this application. The terms "include" and "contain" and any variations thereof used in the specification, claims, and brief description of drawings of this application are intended as non-exclusive inclusion.

In the description of some embodiments of this application, the technical terms "first" and "second" are merely intended to distinguish between different items but not intended to indicate or imply relative importance or implicitly specify the number of the indicated technical features, specific order, or order of precedence. In the description of some embodiments of this application, unless otherwise expressly specified, "a plurality of" means two or more.

Reference to an "embodiment" herein means that a specific feature, structure or characteristic described with reference to this embodiment may be included in at least one embodiment of this application. Reference to this term in different places in the specification does not necessarily represent the same embodiment, nor does it represent an independent or alternative embodiment in a mutually exclusive relationship with other embodiments. A person skilled in the art explicitly and implicitly understands that the embodiments described herein may be combined with other embodiments.

In the description of embodiments of this application, the term "and/or" merely indicates a relationship between related items, and represents three possible relationships. For example, "A and/or B" may represent the following three circumstances: A alone, both A and B, and B alone. In addition, the character "/" herein generally indicates an "or" relationship between the item preceding the character and the item following the character.

In the description of embodiments of this application, the term "a plurality of" means two or more (including two). Similarly, "a plurality of groups" means two or more groups (including two groups), and "a plurality of pieces" means two or more pieces (including two pieces).

In the description of embodiments of this application, a direction or a positional relationship indicated by the terms such as "center", "longitudinal", "transverse", "length", "width", "thickness", "up", "down", "before", "after", "left", "right", "vertical", "horizontal", "top", "bottom", "in", "out", "clockwise", "counterclockwise", "axial", "radial", and "circumferential" is a direction or positional relationship based on the illustration in the drawings, and is merely intended for ease or brevity of description of embodiments of this application, but not intended to indicate or imply that the indicated device or component is necessarily located in the specified direction or constructed or operated in the specified direction. Therefore, such terms are not to be understood as a limitation on embodiments of this application.

In the description of this application, unless otherwise expressly specified and defined, the technical terms such as "mount", "concatenate", "connect", and "fix" are generic in a broad sense, for example, mean a fixed connection, a detachable connection, or a one-piece configuration; or mean a mechanical connection or an electrical connection; or mean a direct connection or an indirect connection implemented through an intermediary; or mean internal communication between two components or interaction between two components. A person of ordinary skill in the art can understand the specific meanings of the terms in some embodiments of this application according to specific situations.

In this application, the term "alkyl" is a group formed from an alkane by the loss of one hydrogen atom, for example, an methyl formed from methane by the loss of one hydrogen atom. The term "alkylene" or "alkylidene" is a group formed from an alkane by the loss of two hydrogen atoms, for example, a methylene formed from methane by the loss of two hydrogen atoms.

The term "chain alkane" means an alkane in which all carbon atoms are linked in the form of carbon-carbon single bonds without forming a ring, and all the remaining valence bonds are bonded to hydrogen atoms. The chain alkanes are classed into linear alkanes and branched alkanes.

In this application, the "number of ring atoms" means the number of atoms bonded to form a ring. When the ring is substituted by a substituent, the atoms contained in the substituent are not included in the ring atoms. The "number of ring atoms" mentioned below bears the same meaning unless otherwise expressly specified. For example, the number of ring atoms of a benzene ring is 6, the number of ring atoms of a naphthalene ring is 10, and the number of ring atoms of a thiophene ring is 5.

"Aromatic group" means a hydrocarbon group containing at least one aromatic ring, and is classed into non-condensed ring aromatic groups and condensed ring aromatic groups. A condensed ring aromatic group means a group formed by connecting two or more aromatic rings through two shared adjacent ring atoms, that is, a condensed ring.

Non-limiting examples of "aromatic groups" in this application include: benzene, naphthalene, anthracene, fluoranthene, phenanthrene, triphenylene, perylene, tetracene, pyrene, benzopyrene, acenaphthene, fluorene, and the like. Non-limiting examples of "heteroaromatic groups" include: triazine, pyridine, pyrimidine, imidazole, furan, thiophene, benzofuran, benzothiophene, indole, carbazole, pyrroloimidazole, pyrrolopyrrole, thienopyrrole, thienothiophene, furanopyrrole, furanofuran, thienofuran, benzisoxazole, benzisothiazole, benzimidazole, quinoline, isoquinoline, cinnoline, quinoxaline, phenanthridine, perimidine, quinazoline, quinazolinone, dibenzofuran, dibenzothiophene, carbazole, and the like.

In this application, when no linking site is specified in a group, any available linking site in the group can be used as a linking site.

In this application, the single bond connected to the substituent runs through the corresponding ring, indicating that the substituent can be connected to any site of the ring. For example, in

R is connected to any substitutable site of the benzene ring.

In this application, "*" represents a linking site.

In this application, when two groups are connected by a linking site, for example, in when R is selected from a single bond, it means that the two groups do not need to be connected through a specific group, but are directly connected by a single bond, that is, In this application, the term "structural unit", also called a "monomer unit", means a basic unit of a monomer molecule entering a macromolecular chain through a polymerization reaction. The elements in a structural unit may be the same as or different from the elements in a monomer unit. There may be one or more types of structural units in a polymer molecule. When there is only one type of structural unit in a polymer molecule, the "structural unit" is a repeating unit. For example, in polyvinyl chloride $(CH_2—CHCl)_n$, the repeating unit is the same as the structural unit, both being $—CH_2CHCl—$. In contrast, nylon-66 includes two types of structural units.

As mentioned in the background technology, in a process of preparing an electrode plate, the volatilization of the solvent gives rise to a stress inside the electrode plate. The cohesive force provided by constituents of a binder in the electrode slurry is not enough to withstand the stress, thereby causing the electrode plate to crack. Especially when the coating is thick, the electrode plate is prone to crack, thereby contrarily causing an adverse effect onto the cycle stability of the battery. In conventional technology, linear binders such as PVDF or SBR are typically used, and the cohesive force of such binders is not enough to withstand the drying stress. In some techniques, an attempt is made to use a crosslinkable polymer as a binder, but still exerting a limited effect in improving the crack resistance and stability of the electrode plate.

The technical personnel of this application have conducted a lot of experimental investigation on the structure of the binder and the performance of the electrode plate. The investigation shows that the crosslinking structure of the three-dimensional network structure of the binder is merely one of the factors that increase the cohesive force of the binder. The selection of the groups on the macromolecular chain in the binder also plays an important role in enhancing the adhesion and stability of the binder.

The technicians of this application put forward a binder prepared from a main polymer containing an unsaturated bond and a micromolecular crosslinking agent containing a plurality of thiol groups. The main polymer and the crosslinking agent can be interlinked to form a three-dimensional network structure based on thiol-click chemistry reactions, so as to increase the cohesive force of the binder. During the investigation, the technicians find that, on the one hand, the aromatic group is conducive to improving the cohesive energy of the crosslinked binder; on the other hand, the activity of the molecular chain of the main polymer plays a key role in the bonding performance of the binder. If the main polymer contains an aromatic group, the steric hindrance of the aromatic group is large and is prone to restrict the internal rotation of the main polymer and reduce the flexibility of the main polymer, thereby being unfavorable to bonding with an active material or a current collector. Both the bonding property and cohesive force of the binder affect the stability and crack resistance of the electrode plate. It is difficult to achieve a balance between the cohesive force and the bonding property.

Therefore, through a large number of creative experiments, the technicians of this application have developed a resin composition to improve the adhesion and stability of the binder. When used for preparing an electrode plate, the resin composition can improve the stability and crack resistance of the electrode plate, thereby improving the cycle stability of the battery.

An embodiment of this application provides a resin composition. The resin composition includes a main polymer and a crosslinking agent. The crosslinking agent is represented by Formula (A):

$$(HS)_{n_1}\text{-}L_1\text{-}Ar_1\text{-}L_1\text{-}(SH)_{n_1} \quad (A)$$

In the formula above, $Ar_1$ is an aromatic group containing 6 to 50 ring atoms, and each $L_1$ is independently selected from one or more of a single bond, a $C_1$ to $C_{50}$ alkylene, or a dynamic covalent bond group.

Each $n_1$ is independently selected from integers from 1 to 3.

A structural unit of the main polymer contains a structure represented by Formula (1), and the main polymer contains no aromatic group:

(1)

In the formula above, $R_1$ and $R_2$ each are any one independently selected from a single bond, a substituted or unsubstituted $C_1$ to $C_{15}$ alkylene, a substituted or unsubstituted $C_2$ to $C_{15}$ alkenylene, or a substituted or unsubstituted $C_2$ to $C_{15}$ alkyl ether group.

$L_2$ is a substituted or unsubstituted $C_1$ to $C_{20}$ hydrocarbon group, and the hydrocarbon group contains an olefinic bond and/or an acetylenic bond.

* is a linking site.

It is hereby noted that the main polymer may be a homopolymer or a copolymer. "The structural unit of the main polymer contains the structure represented by Formula (1)" means that the structural unit of the main structure may contain other structures.

In the above resin composition, the main polymer contains no aromatic group, and the structural unit contains the structure represented by Formula (1), thereby allowing the polymer molecular chain to rotate easily, and enhancing the flexibility of the molecular chain, and in turn, increasing the adhesion of the resin composition. In addition, the micromolecular crosslinking agent contains an aromatic group and two or more thiol groups. The main polymer and the crosslinking agent can stably coexist at normal temperature. Under conditions such as heating, the thiol group in the crosslinking agent can react with the olefinic bond and/or acetylenic bond in the main polymer to form a carbon-sulfur single bond, so as to crosslink the resin composition to form a crosslinked resin that assumes a three-dimensional network structure. The aromatic group in the micromolecular crosslinking agent can further improve the cohesion of the three-dimensional network structure. When used as a binder to prepare an electrode plate, the resin composition can maintain high adhesion to the active material and the current collector in the electrode plate. The resin composition is of both high stability of adhesion and excellent cohesion, and can improve the crack resistance of the electrode plate and effectively suppress the volume change of the active material during charge-discharge cycling, thereby improving the cycle stability of the battery.

It is hereby noted that, in the structure (1)

"[ ]" means that the bracketed structure is located on the main chain of the polymer. In other words, the * in this structure is a linking site between this structure and the chain-forming atoms of the main chain in the main polymer.

In some embodiments, the main polymer contains at least one terminal olefinic bond or one terminal acetylenic bond.

The terminal olefinic bond means a structure —CH=CH$_2$, in which two hydrogen atoms exist on one bond-forming carbon atom in a double bond, and only one hydrogen atom exists on the other bond-forming carbon atom in the double bond. Similarly, the terminal acetylenic bond means a structure $$—C\equiv CH,$$

in which 1 hydrogen atom exists on one bond-forming carbon atom in a triple bond, and no hydrogen atom exists on the other bond-forming carbon atom in the triple bond.

The terminal olefinic bond or the terminal acetylenic bond is more reactivity in reacting with the thiol group in the crosslinking agent, thereby being more conducive to the crosslinking of the resin.

In some embodiments, $R_1$ and $R_2$ each are any one independently selected from a single bond, a $C_1$ to $C_{15}$ chain alkylene, a $C_2$ to $C_{15}$ chain alkenylene, or a $C_2$ to $C_{15}$ chain alkyl ether group.

In some embodiments, $R_1$ and $R_2$ each are independently selected from a single bond or $CR_3R_4$; and $R_3$ and $R_4$ each are one or more independently selected from hydrogen, halogen, a substituted or unsubstituted $C_1$ to $C_{10}$ alkyl, an ester group, a carboxyl, a carboxyl salt group, a hydroxyl, an amino group, or a cyano group.

In some embodiments, $R_3$ and $R_4$ each are one independently selected from hydrogen, an unsubstituted $C_1$ to $C_{10}$ alkyl, a halogen-substituted $C_1$ to $C_{10}$ alkyl, a $C_1$ to $C_{10}$ alkyl ester group, a carboxyl-substituted $C_1$ to $C_{10}$ alkyl, a carboxyl salt-substituted $C_1$ to $C_{10}$ alkyl, a hydroxy-substituted $C_1$ to $C_{10}$ alkyl, an amino-substituted $C_1$ to $C_{10}$ alkyl, or a cyano-substituted $C_1$ to $C_{10}$ alkyl.

In some embodiments, the carboxyl salt group is an ammonium carboxylate salt group or a metal carboxylate salt group, with a structure of —COOK, in which K is $NH_4^+$ or a monovalent metal cation. Further, the monovalent metal cation is selected from alkali metal ions, including but not limited to potassium ions, sodium ions, lithium ions, and the like.

In some embodiments, $R_3$ and $R_4$ each are one independently selected from hydrogen, an unsubstituted $C_1$ to $C_{10}$ chain alkyl, a halogen-substituted $C_1$ to $C_{10}$ chain alkyl, a $C_1$ to $C_{10}$ chain alkyl ester group, a carboxyl-substituted $C_1$ to $C_{10}$ chain alkyl, a carboxylate salt-substituted $C_1$ to $C_{10}$ chain alkyl, a hydroxy-substituted $C_1$ to $C_{10}$ alkyl, an amino-substituted $C_1$ to $C_{10}$ alkyl, or a cyano-substituted $C_1$ to $C_{10}$ alkyl.

In some embodiments, $R_3$ and $R_4$ each are one independently selected from hydrogen, an unsubstituted $C_1$ to $C_5$ chain alkyl, a halogen-substituted $C_1$ to $C_5$ chain alkyl, a $C_1$ to $C_5$ chain alkyl ester group, a carboxyl-substituted $C_1$ to $C_5$ chain alkyl, a carboxylate salt-substituted $C_1$ to $C_5$ chain alkyl, a hydroxy-substituted $C_1$ to $C_{10}$ alkyl, an amino-substituted $C_1$ to $C_5$ alkyl, or a cyano-substituted $C_1$ to $C_5$ alkyl.

In some embodiments, the $C_1$ to $C_{10}$ chain alkyl ester group is a structure formed from a $C_1$ to $C_{10}$ chain alkane ester by the loss of one hydrogen atom. The structural formula of the $C_1$ to $C_{10}$ chain alkane ester is where each $R_{11}$ is independently selected from $C_1$ to $C_5$ chain alkyls, and the total number of carbon atoms in all $R_{11}$ is not greater than 9.

Further, each $R_{11}$ is independently selected from $C_1$ to $C_3$ chain alkyls, and optionally, each $R_{11}$ is independently selected from $C_1$ to $C_2$ chain alkyls.

In some embodiments, $L_2$ is a substituted or unsubstituted $C_1$ to $C_{20}$ hydrocarbon group, and the hydrocarbon group contains an olefinic bond and/or an acetylenic bond.

In some embodiments, $L_2$ is a substituted or unsubstituted $C_1$ to $C_{10}$ chain hydrocarbon group, and the hydrocarbon group contains a terminal olefinic bond and/or a terminal acetylenic bond.

In some embodiments, the structural unit of the main polymer contains a structure represented by Formula (1-1) and/or a structure represented by Formula (1-2):

Each $R_5$ is one or more independently selected from hydrogen, halogen, a substituted or unsubstituted $C_1$ to $C_{10}$ alkyl, an ester group, a carboxyl, a carboxyl salt group, a hydroxyl, an amino group, or a cyano group.

In some embodiments, each $R_5$ is any one independently selected from hydrogen, halogen, an unsubstituted $C_1$ to $C_{10}$ alkyl, a halogen-substituted $C_1$ to $C_{10}$ alkyl, a $C_1$ to $C_{10}$ alkyl ester group, a carboxyl-substituted $C_1$ to $C_{10}$ alkyl, a carboxyl salt-substituted $C_1$ to $C_{10}$ alkyl, a hydroxy-substituted $C_1$ to $C_{10}$ alkyl, an amino-substituted $C_1$ to $C_{10}$ alkyl, or a cyano-substituted $C_1$ to $C_{10}$ alkyl.

The halogen includes, but is not limited to, bromine, chlorine, and iodine. "$C_1$ to $C_{10}$ alkyl ester group" bears the same meaning as interpreted above, the details of which are omitted here.

In some embodiments, each $R_5$ is any one independently selected from hydrogen, halogen, an unsubstituted $C_1$ to $C_{10}$ chain alkyl, a halogen-substituted $C_1$ to $C_{10}$ chain alkyl, a $C_1$ to $C_{10}$ chain alkyl ester group, a carboxyl-substituted $C_1$ to $C_{10}$ chain alkyl, a carboxyl salt-substituted $C_1$ to $C_{10}$ chain alkyl, a hydroxy-substituted $C_1$ to $C_{10}$ chain alkyl, an amino-substituted $C_1$ to $C_{10}$ chain alkyl, or a cyano-substituted chain $C_1$ to $C_{10}$ alkyl.

In some embodiments, each $R_5$ is any one independently selected from hydrogen, halogen, an unsubstituted $C_1$ to $C_{10}$ chain alkyl, a halogen-substituted $C_1$ to $C_{10}$ chain alkyl, a $C_1$ to $C_{10}$ chain alkyl ester group, a carboxyl-substituted $C_1$ to $C_{10}$ chain alkyl, a carboxyl salt-substituted $C_1$ to $C_{10}$ chain alkyl, a hydroxy-substituted $C_1$ to $C_{10}$ chain alkyl, an amino-substituted $C_1$ to $C_{10}$ chain alkyl, or a cyano-substituted $C_1$ to $C_{10}$ chain alkyl.

In some embodiments, each $R_5$ is any one independently selected from hydrogen, halogen, an unsubstituted $C_1$ to $C_5$ chain alkyl, a halogen-substituted $C_1$ to $C_5$ chain alkyl, a $C_1$ to $C_5$ chain alkyl ester group, a carboxyl-substituted $C_1$ to $C_5$ chain alkyl, a carboxyl salt-substituted $C_1$ to $C_5$ linear alkyl, a hydroxy-substituted $C_1$ to $C_5$ chain alkyl, an amino-substituted $C_1$ to $C_5$ chain alkyl, or a cyano-substituted $C_1$ to $C_5$ chain alkyl.

$R_6$ is selected from a single bond or a substituted or unsubstituted $C_1$ to $C_{10}$ alkylene.

In some embodiments, $R_6$ is selected from a single bond or an unsubstituted $C_1$ to $C_{10}$ alkylene.

In some embodiments, $R_6$ is selected from a single bond or an unsubstituted $C_1$ to $C_5$ alkylene.

In some embodiments, $R_6$ is a single bond.

In some embodiments, the structural unit of the main polymer contains at least one of the following structures:

A main polymer containing a structural unit with a terminal olefinic bond may be prepared from a conjugated diene monomer corresponding to the above structural unit. The technicians of this application find that, by controlling the conditions of polymerization, the direction of polymerization can be regulated, so as to obtain a main polymer containing a structural unit with a terminal olefinic bond. For example, when the main polymer is prepared by using butadiene as a monomer, the monomer polymerizes in a low-temperature non-polar solvent, thereby being more inclined to 1,2-addition, and making the molecular chain contain a terminal olefinic bond. A possible reason is that in a polar solvent, the polarity of the solvent exerts an inductive effect on the conjugated diene, thereby intensifying the polarization of the conjugated diene and favoring 1,4-addition. Conversely, in a non-polar solvent, the 1,2-addition is favored. When the temperature rises, due to the accelerated thermal motion, the collision force between molecules increases, the deformation of the electron cloud of the conjugated diene is increased, and the polarization is intensified, thereby favoring 1,4-addition. Conversely, when the temperature is lowered, the 1,2-addition is favored.

The temperature range of the low-temperature non-polar solvent at low temperatures is −80° C. to 20° C. The non-polar solvent is selected from $C_1$ to $C_8$ alkane solvents.

Non-limiting examples of the non-polar solvent include n-hexane, n-pentane, and the like.

In some embodiments, at least one structural unit of the main polymer is represented by Formula (1-1) or Formula (1-2).

In some embodiments, a molar percent of the structural unit containing a structure represented by Formula (1) in the main polymer is not less than 2.5%.

Understandably, there may be one type or more types of the structural units in the main polymer. The molar percent means a percentage of the molar mass of the structural unit containing the structure represented by Formula (1) in relation to the total molar mass of all structural units in the main polymer.

By controlling the molar percent of the structural unit containing the structure represented by Formula (1) to the specified range, it is ensured that the main molecules in the main polymer contain sufficient crosslinking sites, that is, olefinic bonds or acetylenic bonds.

In some embodiments, in the main polymer, the molar percent of the structural unit containing the structure represented by Formula (1) is 2.5% to 100%. Optionally, the molar percent of the structural unit containing the structure represented by Formula (1) is 2.5% to 75%. Optionally, the molar percent of the structural unit containing the structure represented by Formula (1) is 2.5% to 64%.

In some embodiments, the molar percent of the structural unit containing the structure represented by Formula (1-1) and/or Formula (1-2) is not less than 2.5%. Optionally, the molar percent is 2.5% to 100%. Optionally, the molar percent is 2.5% to 75%. Optionally, the molar percent is 10% to 100%. Optionally, the molar percent is 10% to 75%. Optionally, the molar percent is 10% to 64%.

In some embodiments, the molar percent of the structural unit represented by Formula (1-1) and/or Formula (1-2) is not less than 2.5%. Optionally, the molar percent is 2.5% to 100%. Optionally, the molar percent is 2.5% to 75%. Optionally, the molar percent is 10% to 100%. Optionally, the molar percent is 10% to 75%. Optionally, the molar percent is 10% to 64%.

Understandably, during the preparation, the molar percent of the structural unit in the main polymer can be regulated by controlling the molar percent of the monomer corresponding to the structural unit.

In some embodiments, the main polymer further contains the structural unit represented by Formula (2):

(2)

In the formula above, each $R_7$ is one or more independently selected from hydrogen, halogen, a substituted or unsubstituted $C_1$ to $C_5$ alkyl, an ester group, a carboxyl, a carboxyl salt group, a hydroxyl, an amino group, or a cyano group.

In some embodiments, each $R_7$ is one independently selected from hydrogen, halogen, an unsubstituted $C_1$ to $C_5$ alkyl, a halogen-substituted $C_1$ to $C_5$ alkyl, a $C_1$ to $C_5$ alkyl ester group, a carboxyl-substituted $C_1$ to $C_5$ alkyl, a hydroxy-substituted $C_1$ to $C_5$ alkyl, an amino-substituted $C_1$ to $C_5$ alkyl, or a cyano-substituted $C_1$ to $C_5$ alkyl.

In some embodiments, each $R_7$ is independently selected from hydrogen, an unsubstituted $C_1$ to $C_5$ alkyl, or a halogen-substituted $C_1$ to $C_5$ alkyl.

In a specific example, Formula (2) is the following structure:

In some embodiments, the molar percent of the structural unit represented by Formula (2) in the main polymer is 0 to 36%.

Optionally, the molar percent of the structural unit represented by Formula (2) is 1% to 36%.

Optionally, the molar percent of the structural unit represented by Formula (2) is 5% to 36%.

Optionally, the molar percent of the structural unit represented by Formula (2) is 10% to 35.5%.

Optionally, the molar percent of the structural unit represented by Formula (2) is 20% to 35.5%.

Optionally, the molar percent of the structural unit represented by Formula (2) is 30% to 35.5%.

In some embodiments, the main polymer further contains the structural unit represented by Formula (3):

(3)

In the formula above, $L_1$ is selected from $C_1$ to $C_{10}$ chain alkylenes, and each $R_{12}$ is independently selected from $C_2$ to $C_5$ alkenyls.

The $R_{12}$ groups in the structural unit may be the same group or different groups.

In some embodiments, Lu is selected from $C_3$ to $C_{10}$ branched alkylenes, and each $R_{12}$ is independently selected from $C_2$ to $C_3$ alkenyls.

The structural unit represented by Formula (3) contains a plurality of unsaturated double bonds, and can form a crosslinked main polymer during polymerization to improve the mechanical properties.

In some embodiments, the molar percent of the structural unit represented by Formula (3) in the main polymer is 0 to 1%.

When the molar percent falls within this range, the formed main polymer possesses a slightly crosslinked system, and is soluble in a solvent and possesses a specified level of mechanical properties.

Optionally, the molar percent of the structural unit represented by Formula (3) in the main polymer is 0.01% to 1%.

Optionally, the molar percent of the structural unit represented by Formula (3) in the main polymer is 0.015% to 1%.

Optionally, the molar percent of the structural unit represented by Formula (3) in the main polymer is 0.015% to 0.5%.

Optionally, the molar percent of the structural unit represented by Formula (3) in the main polymer is 0.015% to 0.4%.

Optionally, the molar percent of the structural unit represented by Formula (3) in the main polymer is 0.015% to 0.1%.

Optionally, the molar percent of the structural unit represented by Formula (3) in the main polymer is 0.015% to 0.05%.

In a specific example, the structural unit represented by Formula (3) is:

In some embodiments, the number-average molecular weight of the main polymer is 2000 to 2,000,000.

By adjusting the number-average molecular weight of the main polymer, the adhesion and stability of the resin composition can be further optimized. When the molecular weight of the main polymer is excessively low, the generated adhesion is not enough to meet the requirements, the bonding effect is relatively low, and the electrode plate is prone to cracking and active material stripping. When the molecular weight of the main polymer is excessively high, the problems such as difficulty in dissolving and slurry gelling are prone to occur.

In some embodiments, the number-average molecular weight of the main polymer is 50,000 to 2,000,000.

In some embodiments, the number-average molecular weight of the main polymer is 100,000 to 2,000,000.

In some embodiments, the number-average molecular weight of the main polymer is 200,000 to 2,000,000.

In some embodiments, the number-average molecular weight of the main polymer is 200,000 to 1,500,000.

In some embodiments, the number-average molecular weight of the main polymer is 1,000,000.

In some embodiments, $Ar_1$ is any one selected from the following structures:

In the structural formulas above, Y is any one selected from $CR_8$, O, S, or S=O.

Each $X_1$ independently represents $CR_9$ or N, and not all $X_1$ symbols in the same structural formula represent N.

Each $R_8$ and $R_9$ are any one independently selected from hydrogen or a substituted or unsubstituted $C_1$ to $C_{10}$ chain alkyl.

Optionally, each $X_1$ represents $CR_9$.

Each $R_9$ is any one independently selected from hydrogen or a substituted or unsubstituted $C_1$ to $C_5$ chain alkyl.

Each $R_8$ is any one independently selected from hydrogen or a substituted or unsubstituted $C_1$ to $C_5$ chain alkyl.

In a specific example, $Ar_1$ is a phenyl or thienyl or naphthyl.

In some embodiments, the structure of the crosslinking agent is represented by any one of Formulas (A-1) to (A-3):

(A-1)

(A-2)

(A-3)

In some embodiments, the dynamic covalent bond in the dynamic covalent bond group is at least one selected from a borate ester bond, an acylhydrazone bond, or a Diels-Alder bond.

The dynamic covalent bond is a reversible covalent bond. The reversibility means: through slight stimulation from the environment, the reaction equilibrium is shifted, and the covalent bond is reversibly formed and broken. After the binder is damaged by an external force or the environment, the broken dynamic covalent bond is automatically rearranged in a reversible manner, thereby allowing the bonding structure to self-repair. During the preparation and use of the electrode plate, when the electrode is mechanically damaged, cracked, or impaired, the reversible dynamic covalent bond can be rearranged to repair structural defects and protect the safety of the battery.

In some embodiments, the structure of $L_1$ is represented by any one of the following formulas:

In the formulas above, each $L_{12}$ is any one independently selected from a single bond or a $C_1$ to $C_5$ chain alkylene; and $L_{13}$ is any one selected from hydrogen or a $C_1$ to $C_5$ chain alkyl.

In some embodiments, the structure of $L_1$ is represented by any one of the following formulas:

In the formulas above, $L_{12}$ is connected to the thiol group in the crosslinking agent.

Further, $L_{12}$ is any one independently selected from $C_1$ to $C_3$ linear alkylenes or branched alkylenes, and non-limiting examples thereof include: methylene, ethylene (—CHCH$_3$—). $L_{13}$ is any one selected from $C_1$ to $C_3$ linear alkyls, and non-limiting examples thereof include: methyl, ethyl, and the like.

In some embodiments, the mass ratio of the crosslinking agent to the main polymer is (0.001 to 0.1): 1.

By controlling the mass ratio of the crosslinking agent to the main polymer, the formed crosslinked network structure is further optimized to ensure excellent adhesion and stability. When the dosage of crosslinking agent is excessive, the electrode plate becomes hard and brittle, thereby exerting an adverse effect instead.

In some embodiments, the mass ratio of the crosslinking agent to the main polymer is (0.008 to 0.1): 1.

In some embodiments, the mass ratio of the crosslinking agent to the main polymer is (0.02 to 0.1): 1.

In some embodiments, the mass ratio of the crosslinking agent to the main polymer is (0.06 to 0.1): 1.

In some embodiments, the mass ratio of the crosslinking agent to the main polymer is (0.008 to 0.06): 1.

In an embodiment of this application, a crosslinking resin is provided. The crosslinking resin assumes a three-dimensional network structure formed by linking the main polymer and the crosslinking agent in the above resin composition through a crosslinking site, the crosslinking site includes a carbon-sulfur single bond formed by an unsaturated bond in the main polymer and a thiol bond in the crosslinking agent. The unsaturated bond is selected from an olefinic bond and/or an acetylenic bond.

Specifically, the carbon-sulfur single bond is obtained by an addition reaction between an unsaturated bond in the main polymer and a thiol bond in the crosslinking agent. Specifically, the carbon-sulfur single bond is formed through a thiol-click chemistry reaction. For example, a plurality of thiol groups on one molecule of a crosslinking agent are bonded to olefinic bonds on a plurality of main polymer chains through an olefin-thiol-click chemistry reaction method to form a carbon-sulfur single bond respectively, thereby crosslinking a plurality of main polymer molecular chains to form a three-dimensional network structure. The olefin-thiol-click chemistry reaction and the alkyne-thiol-click chemistry reaction are shown in the following Formula (a) and Formula (b) respectively. The product of Formula (b) contains not only a carbon-sulfur single bond, but also an olefinic bond. The olefinic bond may further react with the thiol group through addition reaction to form a carbon-sulfur single bond. The following Formula (a) and Formula (b) are merely examples of specific reactions.

In some embodiments, the formation of the crosslinking site may be initiated by heat or light. Further, when the crosslinking site is initiated by heat, the temperature is controlled to be 70° C. to 110° C.

An embodiment of this application further provides application of the resin composition in preparing a binder.

An embodiment of this application provides a binder. The binder includes the resin composition disclosed above.

In the resin composition, the main polymer and the crosslinking agent can stably coexist at normal temperature. Under conditions such as heating, the thiol group in the crosslinking agent can react with the olefinic bond and/or acetylenic bond in the main polymer to form a carbon-sulfur single bond, so as to crosslink the resin composition to form a crosslinked resin that assumes a three-dimensional network structure. The aromatic group in the micromolecular crosslinking agent can further improve the cohesion of the three-dimensional network structure. When used as a binder to prepare an electrode plate, the resin composition can maintain high adhesion to the active material and the current collector in the electrode plate. The resin composition is of both high stability of adhesion and excellent cohesion, and can improve the crack resistance of the electrode plate and effectively suppress the volume change of the active material during charge-discharge cycling, thereby improving the cycle stability of the battery.

An embodiment of this application further provides an electrode slurry. Constituents of the electrode slurry include a solvent and the above resin composition.

In some embodiments, based on a total mass of the constituents of the electrode slurry except the solvent, a mass percent of the resin composition is 1% to 10%.

In some embodiments, the solvent is water.

In some embodiments, the electrode slurry further includes an electrode active material and a conductive agent.

The electrode active material is a positive active material or a negative active material.

The positive active material may include at least one of the following materials: olivine-structured lithium-containing phosphate, lithium transition metal oxide, and a modified compound thereof. However, this application is not limited such materials. One of the positive active materials may be used alone, or at least two thereof may be used in combination. Examples of the lithium transition metal oxide may include, but without being limited to, at least one of lithium cobalt oxide (such as $LiCoO_2$), lithium nickel oxide (such as $LiNiO_2$), lithium manganese oxide (such as $LiMnO_2$ and $LiMn_2O_4$), lithium nickel cobalt oxide, lithium manganese cobalt oxide, lithium nickel manganese oxide, lithium nickel cobalt manganese oxide (such as $LiNi_{1/3}Co_{1/3}Mn_{1/3}O_2$ (briefly referred to as NCM333), $LiNi_{0.5}Co_{0.2}Mn_{0.3}O_2$ (briefly referred to as NCM523), $LiNi_{0.5}Co_{0.25}Mn_{0.25}O_2$ (briefly referred to as NCM211), $LiNi_{0.6}Co_{0.2}Mn_{0.2}O_2$ (briefly referred to as NCM622), $LiNi_{0.8}Co_{0.1}Mn_{0.1}O_2$ (briefly referred to as NCM811), lithium nickel cobalt aluminum oxide (such as $LiNi_{0.85}Co_{0.15}Al_{0.05}O_2$), or a modified compound thereof. Examples of the olivine-structured lithium-containing phosphate salt may include, but are not limited to, at least one of lithium iron phosphate (such as $LiFePO_4$ (LFP for short)), lithium manganese phosphate (such as $LiMnPO_4$), or lithium manganese iron phosphate.

In some embodiments, the molecular formula of the positive active material is: $LiFe_xMn_{(1-x)}PO_4$, where x is any number from 0 to 1.

Understandably, when x is 0, $LiFe_xMn_{(1-x)}PO_4$ is $LiMnPO_4$, that is, lithium manganese phosphate; and, when x is 1, $LiFePO_4$ is $LiFePO_4$, that is, lithium iron phosphate.

The negative active material may include at least one of the following materials: artificial graphite, natural graphite, soft carbon, hard carbon, silicon-based material, tin-based material, lithium titanium oxide, and the like. The silicon-based material may be at least one selected from elemental silicon, a silicon-oxygen compound, a silicon-carbon composite, a silicon-nitrogen composite, and a silicon alloy. The tin-based material may be at least one selected from elemental tin, a tin-oxygen compound, or a tin alloy. However, this application is not limited to such materials, and other conventional materials usable as a negative active material of a battery may be used instead. One of the negative active materials may be used alone, or at least two thereof may be used in combination.

In some embodiments, when the electrode active material is a positive active material, the mass percent of the resin composition is 1% to 3%; when the electrode active material is a negative active material, the mass percent of the resin composition is 5% to 8%.

The volume variation coefficient of the negative active materials such as the silicon-based material and the tin-based material is large, and the mass percent of the resin may be increased accordingly to further improve the stability of the electrode plate.

The conductive agent may be a conductive agent commonly used in the art, including but not limited to, at least one of graphite, carbon nanotubes, nanofibers, carbon black, or graphene.

Specifically, the conductive agent may be at least one selected from SP, KS-6, acetylene black, branched Ketjen black ECP, SFG-6, vapor-grown carbon fibers VGCF, carbon nanotubes CNTs, graphene, or a composite conductive agent compounded thereof.

An embodiment of this application further provides an electrode plate. The electrode plate includes a current collector and an active layer carried on the current collector. Constituents of the active layer include the above crosslinking resin.

In some embodiments, based on the mass of the active layer, the mass percent of the crosslinking resin is 1% to 10%.

In some embodiments, the constituents of the active layer further include an electrode active material and a conductive agent.

The types of the electrode active material and the conductive agent are the same as above, the details of which are omitted here.

The current collector may be a metal foil or a composite current collector. The composite current collector includes at least one metal surface. For example, the metal foil may be aluminum foil. The composite current collector may include a polymer material substrate and a metal layer formed on at least one surface of the polymer material substrate. The composite current collector may be formed by overlaying the polymer material substrate with a metal material (for example, aluminum, aluminum alloy, nickel, nickel alloy, titanium, titanium alloy, silver, and silver alloy). The polymer material substrate may be, for example, polypropylene (PP), polyethylene terephthalate (PET), polybutylene terephthalate (PBT), polystyrene (PS), or polyethylene (PE).

Another embodiment of this application further provides an electrode plate. The electrode plate includes a current collector and an active layer carried on the current collector. The active layer is prepared from a raw material including the above resin composition.

Specifically, the preparation steps of the electrode plate include: coating a surface of the current collector with the electrode slurry to form an active layer to obtain an electrode plate.

Understandably, the coating in this application includes, but is not limited to, print coating, blade coating, spin coating, and inkjet coating.

The resin composition can maintain good adhesion to the active material and the current collector in the electrode plate, and maintain high bonding stability, and is of excellent cohesion, thereby improving the crack resistance of the electrode plate.

An embodiment of this application provides a battery. The battery includes the electrode plate.

The electrode plate is of excellent crack resistance, and can effectively suppress the volume change of the active material during the charge-discharge cycles, thereby improving the cycle stability of the battery.

In some embodiments, the battery includes: a negative electrode plate, a separator, and a positive electrode plate. The positive electrode plate and/or the negative electrode plate is the electrode plate described above.

The type of the separator is not particularly limited in this application, and may be any well-known porous separator that is highly stable both chemically and mechanically.

In some embodiments, the separator may be made of a material that is at least one selected from glass fiber, non-woven fabric, polyethylene, polypropylene, and polyvinylidene difluoride. The separator may be a single-layer film or a multilayer composite film, without being particularly limited. When the separator is a multilayer composite film, materials in different layers may be identical or different, without being particularly limited.

In some embodiments, the positive electrode plate, the negative electrode plate, and the separator may be made into an electrode assembly by winding or stacking. Further, the battery further includes a shell and an electrolyte solution. The electrolyte solution and the electrode assembly are accommodated in the shell.

The shell is configured to package the electrode assembly and the electrolyte solution.

In some embodiments, the shell may be a hard shell such as a hard plastic shell, an aluminum shell, a steel shell, or the like. Alternatively, the shell may be a soft package such as a pouch-type soft package. The soft package may be made of plastic such as polypropylene, polybutylene terephthalate, or polybutylene succinate.

Figure 1:
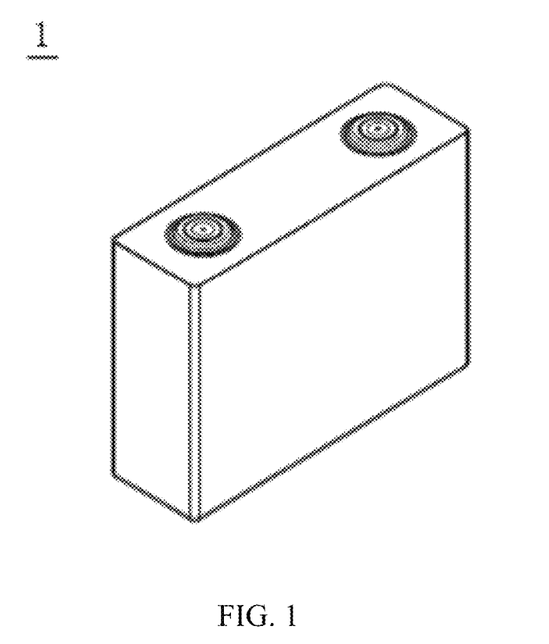
FIG. 1 is a schematic diagram of a battery according to an embodiment of this application.

The shape of the battery is not particularly limited in this application, and may be cylindrical, prismatic or in any other shape. For example, FIG. 1 shows a prismatic battery 1 as an example.

In some embodiments, the electrolyte solution includes an electrolyte salt and a solvent.

In some embodiments, the electrolyte salt may be at least one selected from lithium hexafluorophosphate, lithium tetrafluoroborate, lithium perchlorate, lithium hexafluoroarsenate, lithium bisfluorosulfonimide, lithium bistrifluoromethanesulfonimide, lithium trifluoromethanesulfonate, lithium difluorophosphate, lithium difluoro (oxalato) borate, lithium bis(oxalato) borate, lithium difluoro (bisoxalato) phosphate, and lithium tetrafluoro (oxalato)phosphate.

In some embodiments, the solvent may be at least one selected from ethylene carbonate, propylene carbonate, ethyl methyl carbonate, diethyl carbonate, dimethyl carbonate, dipropyl carbonate, methyl propyl carbonate, ethylene propyl carbonate, butylene carbonate, fluoroethylene carbonate, methyl formate, methyl acetate, ethyl acetate, propyl acetate, methyl propionate, ethyl propionate, propyl propionate, methyl butyrate, ethyl butyrate, 1,4-butyrolactone, sulfolane, methyl sulfonyl methane, ethyl methyl sulfone, and (ethylsulfonyl) ethane.

In some embodiments, the electrolyte solution further optionally includes a functional additive. For example, the functional additive may include a negative electrode film-forming additive or a positive electrode film-forming additive. The additive may further include an additive capable of improving specified performance of the battery, for example, an additive for improving overcharge performance of the battery, or an additive for improving high- or low-temperature performance of the battery.

The battery is a secondary battery or a lithium battery.

Further, this application provides an electrical device. The electrical device includes the battery according to this application.

The battery may be used as a power supply of the electrical device, or used as an energy storage unit of the electrical device.

Further, the electrical device may include, but without being limited to, a mobile device (such as a mobile phone or a laptop computer), an electric vehicle (such as a battery electric vehicle, a hybrid electric vehicle, a plug-in hybrid electric vehicle, an electric bicycle, an electric scooter, an electric golf cart, or an electric truck), an electric train, a ship, a satellite system, or an energy storage system.

The above battery may be selected for use in the electrical device as required.

Figure 2:
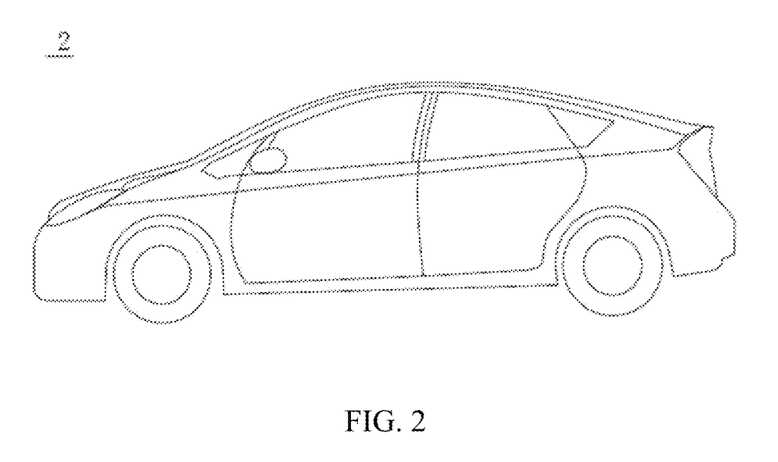
FIG. 2 is a schematic diagram of an electrical device that uses a battery as a power supply according to an embodiment of this application.

FIG. 2 shows an electrical device 2 as an example. The electrical device is a battery electric vehicle, a hybrid electric vehicle, a plug-in hybrid electric vehicle, or the like.

In another example, the device may be a mobile phone, a tablet computer, a notebook computer, or the like. The device is generally required to be thin and light, and may have a secondary battery as a power supply.

EMBODIMENTS

Embodiment 1

(1) Preparing a main polymer according to the following detailed steps:
1. Adding the following constituents into a 30 L reactor with a stirrer: 65 parts of butadiene, 35 parts of acrylonitrile, 0.1 part of trimethylolpropane trimethacrylate, 0.5 part of sodium dodecylbenzene sulfonate, 2.5 parts of potassium oleate composite soap, 0.5 part of tert-dodecyl mercaptan as a molecular weight regulator, 0.3 part of potassium persulfate, 0.02 part of triethanolamine, and 100 parts of water, where the part means a part by mass. Performing emulsion polymerization at 25° C. When the conversion rate reaches 40% to 45%, adding 0.1 part by mass of trimethylolpropane trimethacrylate additionally. When the monomer conversion rate reaches 70% to 75%, raising the temperature to 40° C. to maintain the polymerization reaction. When the monomer conversion rate reaches 90% to 97%, adding hydroxylamine sulfate as a terminator to terminate the polymerization reaction to obtain a main polymer.

Based on the total molar mass of the monomers butadiene, acrylonitrile, and trimethylolpropane trimethacrylate, the molar percent of butadiene is denoted as K, as shown in Table 1 in detail.

Performing an infrared test on the resulting polymer. As shown in the test results, a bending vibration absorption peak of a terminal alkenyl group is exhibited at a wavenumber of approximately 1450 cm$^{-1}$ in an infrared spectrum of the main polymer, indicating that during the polymerization in step (1), butadiene undergoes 1,2 addition, and the resulting main polymer contains the terminal alkenyl group.

Performing a gel permeation chromatography (GPC) test on the resulting polymer by using tetrahydrofuran as a solvent. The number-average molecular weight $M_n$ of the main polymer is 1,000,000, as shown in Table 1 in detail.

2. Dissolving phenylene 1,4-diboronic acid (3.0 g, 18.1 mmol) in 80 mL of tetrahydrofuran, sonicating and stirring the mixture until a completely dissolved state, and then adding α-thioglycerol (4.01 g, 37.1 mmol) and 0.1 mL of deionized water, stirring for 5 min, and then adding MgSO$_4$ (5.0 g). Reacting at room temperature for 24 h, filtering the reaction product upon completion of the reaction, evaporating and concentrating the filtrate to obtain a white solid, and then fully dissolving the white solid in n-heptane, filtering the solution to obtain a filtrate, and evaporating and concentrating the filtrate to obtain a white product. Finally, drying the white product in a 50° C. vacuum oven for 24 hours to obtain a crosslinking agent A1. The structure of the crosslinking agent is as follows:

(2) Mixing artificial graphite as an active material, carbon black as a conductive agent, the main polymer obtained in step (1), the crosslinking agent A1 obtained in step (1), and deionized water at a mass ratio of 53.658:0.22:1.1:0.022:45, and stirring well to obtain a negative electrode slurry. Observing whether the resulting negative electrode slurry gels.

The mass ratio of the crosslinking agent to the main polymer obtained in step (1) is denoted as L.

Based on the total mass of artificial graphite, carbon black as a conductive agent, the main polymer obtained in step (1), and the crosslinking agent A1 obtained in step (1), an aggregate mass percent of the main polymer obtained in step (1) and the crosslinking agent is denoted as M, as detailed in Table 1.

Coating an aluminum foil evenly with the negative electrode slurry in an amount of 300 mg/1540.25 mm² on a single side. Performing oven-drying, cold-pressing, and slitting to obtain a negative electrode plate. Controlling the compaction density of the electrode plate to be 1.65 g/cm³. During the coating, the coating speed is 30 m/min, and the oven includes 7 sections in total. The temperature and air frequency are designed as follows: section 1:80° C. to 100° C., 90 Hz to 110 Hz; section 2:90° C. to 110° C., 90 Hz to 100 Hz; section 3:70° C. to 90° C., 90 Hz to 100 Hz; section 4:70° C. to 90° C., 90 Hz to 100 Hz; section 5:90° C. to 100° C., and 90 Hz to 100 Hz.

(3) Assembling the negative electrode plate obtained in step (2) to form a lithium battery according to the following detailed steps: stacking the positive electrode plate, the separator, and the negative electrode plate sequentially in such a way that the separator is located between the positive electrode plate and the negative electrode plate to serve a function of separation, and then winding the stacked structure to obtain a bare cell. Welding tabs onto the bare cell, and putting the bare cell into an aluminum shell. Dehydrating the cell by drying the cell at 80° C., and then injecting an electrolyte solution into the aluminum shell package and sealing the package. Performing the steps of static standing, hot-pressing, cold-pressing, chemical formation, shaping, and capacity grading to obtain a lithium-ion battery.

The methods for preparing the positive electrode plate, the electrolyte solution, and the separator are as follows:

1. Mixing $LiNi_{0.8}Co_{0.1}Mn_{0.1}O_2$ as a positive active material, conductive carbon SP, conductive graphite, PVDF as a binder, and a dispersant at a mass ratio of 96.94:1.7:0.3:1:0.06 in an N-methyl-pyrrolidone solvent system, stirring well to obtain a slurry, and then coating an aluminum foil with the slurry evenly. Perform oven-drying, cold-pressing, and slitting to obtain a positive electrode plate. Controlling the compaction density of the electrode plate to be 3.45 g/cm³, and controlling a cell balance value (CB value, that is, a ratio of the negative electrode capacity per unit area to the positive electrode capacity per unit area) to be 1.1.
2. Mixing ethylene carbonate (EC) and ethyl methyl carbonate (EMC) well at a volume ratio of 3:7 in an argon atmosphere glovebox ($H_2O$<0.1 ppm, $O_2$<0.1 ppm) to form an organic solvent, adding and dissolving a $LiPF_6$ lithium salt at mass percent of 12.5 wt % in the organic solvent, and stirring well to obtain an electrolyte solution.
3. Using a polypropylene film as a separator.

(4) Testing the performance of the prepared lithium-ion battery, as detailed below:

The lithium-ion battery products in the comparative embodiments and other embodiments are also prepared according to the above steps.

1. Testing the cracks of the electrode plate caused by dryness: Using a charge coupled device (CCD) to observe whether cracks occur at the edge and middle of the electrode plate. A product with cracks is considered a non-conforming product, and a product without cracks is considered a conforming product. Observing 100 electrode plates made in the same batch, and calculate the pass rate according to the following formula:

$$\text{Pass rate} = \text{number of conforming products} \div 100 \times 100\%$$

2. Testing the peel force of the electrode plate: Cutting a negative electrode plate into a strip-shaped electrode plate specimen of 400 mm (length)×30 mm (width) in size by using a cutting die. Taking a flat thin steel sheet of approximately 200 mm to 300 mm in length and approximately 40 mm to 60 mm in width. Sticking double-sided tape at the center of the steel sheet (the length of the double-sided tape is greater than the length of the specimen, and the width of the double-sided tape is 20 mm). Stroking the double-sided tape flat with force to ensure that the double-sided tape fits tightly at the center of the steel sheet.

Exposing the double-sided tape, affixing the electrode plate specimen onto the adhesive tape, and then insert the steel sheet with the bonded and fixed electrode plate into a lower gripper of a tensile machine, and fixing the steel sheet vertically. Inserting an electrode plate unbonded to adhesive tape into an upper gripper of the tensile machine and fixing the electrode plate, so that the electrode plate bonded to the adhesive tape is at an 180° angle to the electrode plate fixed by the upper gripper. Fixing the test specimen, calibrating and resetting the tensile machine. Setting the test width, the electrode plate peeling length 50 mm, and the peeling speed 100 mm/min, and then starting the test, thereby obtaining a peel force curve. Recording the peel force (N/m) when the electrode plate is peeled off. The specific results are shown in Table 1.

3. Testing the capacity retention rate of the battery: charging a lithium-ion battery at a constant current of 1/3 C at 25° C. until the voltage reaches 4.2 V, and then charging the battery at a constant voltage of 4.2 V until the current drops to 0.05 C. Leaving the battery to stand for 5 minutes, and then discharging the battery at a current of 1/3 C until the voltage drops to 2.8 V. Recording the capacity at this time as an initial capacity $C_0$. Repeating the foregoing steps for the same battery, and recording the discharge capacity $C_n$ of the battery at the end of the $n^{th}$ cycle. Calculating the capacity retention rate of the battery at the end of each cycle as: $P_n = C_n/C_0 \times 100\%$. Repeating the above steps for 300 cycles, and recording the capacity retention rate of the lithium-ion battery, as shown in Table 1.

Embodiment 2

Embodiment 2 is substantially the same as Embodiment 1 except that the number-average molecular weight $M_n$ is made to be 200,000 by regulating the polymerization conditions. The remaining steps and conditions are the same as those in Embodiment 1.

Embodiment 3

Embodiment 3 is substantially the same as Embodiment 1 except that the number-average molecular weight $M_n$ is made to be 1,500,000 by regulating the polymerization conditions. The remaining steps and conditions are the same as those in Embodiment 1.

Embodiment 4

Embodiment 4 is substantially the same as Embodiment 1 except that the number-average molecular weight $M_n$ is made to be 2,000,000 by regulating the polymerization conditions. The remaining steps and conditions are the same as those in Embodiment 1.

Embodiment 5

Embodiment 5 is substantially the same as Embodiment 1 except that the number-average molecular weight $M_n$ is made to be 50,000 by regulating the polymerization conditions.

The remaining steps and conditions are the same as those in Embodiment 1.

Embodiment 6

Embodiment 6 is substantially the same as Embodiment 1 except that the number-average molecular weight $M_n$ is made to be 2000 by regulating the polymerization conditions. The remaining steps and conditions are the same as those in Embodiment 1.

Embodiments 7 to 8

Embodiments 7 to 8 are substantially the same as Embodiment 1 except that the molar percent of the butadiene in the monomer is regulated, the K value is adjusted to a different value, and the molecular weight of the polymer is controlled to be the same as that in Embodiment 1. The remaining steps and conditions are the same as those in Embodiment 1.

Embodiment 9

Embodiment 9 is substantially the same as Embodiment 1 except that no trimethylolpropane trimethacrylate is added in step (1), and the molecular weight of the polymer is controlled to be the same as that in Embodiment 1.

The remaining steps and conditions are the same as those in Embodiment 1.

Embodiments 10 to 13

Embodiments 10 to 13 are substantially the same as Embodiment 1 except that the mass ratio L of the crosslinking agent to the main polymer is changed while the total mass of the crosslinking agent and the main polymer is kept the same as that in Embodiment 1, as detailed in Table 1.

The remaining steps and conditions are the same as those in Embodiment 1.

Embodiments 14 to 16

Embodiments 14 to 16 are substantially the same as Embodiment 1 except that the M value in step (2) is changed, as detailed in Table 1.

The remaining steps and conditions are the same as those in Embodiment 1.

Embodiment 17

Embodiment 17 is substantially the same as Embodiment 1 except that the butadiene in Embodiment 1 is replaced with 2-chloro-1,3-butadiene of the same molar mass.

The remaining steps and conditions are the same as those in Embodiment 1, as detailed in Table 1, where K is the molar percent of 2-chloro-1,3-butadiene.

Embodiment 18

Embodiment 18 is substantially the same as Embodiment 1 except that the butadiene in Embodiment 1 is replaced with vinyl acetylene of the same molar mass.

The remaining steps and conditions are the same as those in Embodiment 1, as detailed in Table 1, where K is the molar percent of vinyl acetylene.

Embodiment 19

Embodiment 19 is substantially the same as Embodiment 1 except that, in preparing the crosslinking agent in step (1), phenylene 1,4-diboronic acid is replaced with naphthalene-1,4-diboronic acid of the same molar mass, and the structure of the resulting crosslinking agent A2 is as follows:

The remaining steps are the same as those in Embodiment 1. The detailed results are shown in Table 1.

Embodiment 20

Embodiment 20 is substantially the same as Embodiment 1 except that: in preparing the crosslinking agent in step (1), phenylene 1,4-diboronic acid is replaced with 2,5-thiophene diboronic acid, and the structure of the resulting crosslinking agent A3 is as follows:

The remaining steps are the same as those in Embodiment 1. The detailed results are shown in Table 1.

Embodiment 21

Embodiment 21 is substantially the same as Embodiment 1 except that: in preparing the crosslinking agent in step (1), terephthalic dihydrazide (0.58 g, 3 mmol), 3-mercapto-2-butanone (1.04 g, 10 mmol), 0.3 mL of glacial acetic acid, and 210 mL of deionized water are added into an eggplant-shaped bottle, stirring at room temperature for 7 hours, filtering the mixture, washing the white precipitate with deionized water, and drying the resulting solid in a vacuum oven to obtain a crosslinking agent A4. The structure of the resulting crosslinking agent A4 is as follows:

The remaining steps are the same as those in Embodiment 1. The detailed results are shown in Table 1.

Comparative Embodiment 1

Comparative Embodiment 1 is substantially the same as Embodiment 1 except that: in step (2), the negative electrode slurry is prepared in the following way: mixing graphite as a negative active material, carbon black as a conductive agent, CMC as a thickener, and SBR as a binder at a mass ratio of 96.8:0.7:1:1.5 in a deionized water solvent system, and stirring well to obtain a negative electrode slurry.
The remaining steps and conditions are the same as those in Embodiment 1.

Comparative Embodiment 2

Comparative Embodiment 2 is substantially the same as Embodiment 1 except that no crosslinking agent A1 is added in step (2).
The remaining steps and conditions are the same as those in Embodiment 1.

Comparative Embodiment 3

Comparative Embodiment 3 is substantially the same as Embodiment 1 except that, in preparing the crosslinking agent in step (1), phenylene 1,4-diboronic acid is replaced with butane 1,4-diboronic acid of the same molar mass, and the structure of the resulting crosslinking agent is as follows:

The remaining steps are the same as those in Embodiment 1. The detailed results are shown in Table 1.

Comparative Embodiment 4

Comparative Embodiment 4 is substantially the same as Comparative Embodiment 3 except that, in preparing the main polymer in step (1), acrylonitrile is replaced with styrene of the same molar mass.
The remaining steps are the same as those in Embodiment 1. The detailed results are shown in Table 1.

The relevant physical parameters and test results of each embodiment and comparative embodiment are set out in Table 1.

TABLE 1

|  | K | Main polymer Mn | L | M | Yield rate (%) | Peel force (N/m) | Capacity retention rate (%) | Gelling |
|---|---|---|---|---|---|---|---|---|
| Embodiment 1 | 64% | 1,000,000 | 0.02:1 | 2% | 99 | 45 | 99.4 | No |
| Embodiment 2 | 64% | 200,000 | 0.02:1 | 2% | 57 | 25 | 94.0 | No |
| Embodiment 3 | 64% | 1,500,000 | 0.02:1 | 2% | 88 | 50 | 98.3 | Yes |
| Embodiment 4 | 64% | 2,000,000 | 0.02:1 | 2% | 75 | 50 | 97.8 | Yes |
| Embodiment 5 | 64% | 50,000 | 0.02:1 | 2% | 42 | 15 | 90.1 | No |
| Embodiment 6 | 64% | 2,000 | 0.02:1 | 2% | 36 | 10 | 86.2 | No |
| Embodiment 7 | 20% | 1,000,000 | 0.02:1 | 2% | 87 | 60 | 96.5 | No |
| Embodiment 8 | 2.5% | 1,000,000 | 0.02:1 | 2% | 66 | 40 | 91.7 | Yes |
| Embodiment 9 | 64% | 1,000,000 | 0.02:1 | 2% | 92 | 35 | 92.4 | No |
| Embodiment 10 | 64% | 1,000,000 | 0.1:1 | 2% | 80 | 20 | 89.7 | No |
| Embodiment 11 | 64% | 1,000,000 | 0.06:1 | 2% | 85 | 40 | 98.6 | No |
| Embodiment 12 | 64% | 1,000,000 | 0.008:1 | 2% | 71 | 30 | 96.5 | No |
| Embodiment 13 | 64% | 1,000,000 | 0.001:1 | 2% | 53 | 25 | 93.0 | No |
| Embodiment 14 | 64% | 1,000,000 | 0.02:1 | 1% | 84 | 25 | 91.5 | No |
| Embodiment 15 | 64% | 1,000,000 | 0.02:1 | 5% | 82 | 60 | 92.6 | Yes |
| Embodiment 16 | 64% | 1,000,000 | 0.02:1 | 10% | 67 | 85 | 72.8 | Yes |
| Embodiment 17 | 64% | 1,000,000 | 0.02:1 | 2% | 94 | 50 | 94.6 | No |
| Embodiment 18 | 64% | 1,000,000 | 0.02:1 | 2% | 91 | 40 | 90.7 | No |
| Embodiment 19 | 64% | 1,000,000 | 0.02:1 | 2% | 96 | 45 | 98.0 | No |
| Embodiment 20 | 64% | 1,000,000 | 0.02:1 | 2% | 95 | 40 | 93.9 | No |
| Embodiment 21 | 64% | 1,000,000 | 0.02:1 | 2% | 90 | 40 | 89.5 | No |

TABLE 1-continued

| | K | Main polymer Mn | L | M | Yield rate (%) | Peel force (N/m) | Capacity retention rate (%) | Gelling |
|---|---|---|---|---|---|---|---|---|
| Comparative Embodiment 1 | / | / | / | / | 86 | 10 | 88.0 | Yes |
| Comparative Embodiment 2 | 64% | 1,000,000 | 0:1 | 2% | 46 | 20 | 88.6 | No |
| Comparative Embodiment 3 | 64% | 1,000,000 | 0.02:1 | 2% | 92 | 30 | 85.3 | No |
| Comparative Embodiment 4 | 64% | 1,000,000 | 0.02:1 | 2% | 18 | 5 | 82.9 | Yes |

"/" indicates that the binder system is commercial binder SBR. For other specific process parameters, refer to the text section of Comparative Embodiment 1.

As can be seen from the experimental results in Table 1, when the resin composition of the specified structure in this application is used as a binder to prepare an electrode plate, the resin composition can maintain high adhesion to the active material and the current collector in the electrode plate. The resin composition is of both high stability of adhesion and excellent cohesion, and can improve the crack resistance of the electrode plate and effectively suppress the volume change of the active material during charge-discharge cycling, thereby improving the cycle stability of the battery. In addition, the bonding stability and crack resistance of the resin composition can be further optimized by further regulating the molecular weight of the main polymer in the resin composition, the mass percent of the structural unit, and the mass ratio of the main polymer to the crosslinking agent.

Finally, it is hereby noted that the foregoing embodiments are merely intended to describe the technical solutions of this application but not to limit this application. Although this application has been described in detail with reference to the foregoing embodiments, a person of ordinary skill in the art understands that modifications may still be made to the technical solutions described in the foregoing embodiments, or equivalent replacements may still be made to some or all technical features in the technical solutions. Such modifications and equivalent replacements fall within the scope of the claims and specification hereof without making the essence of the corresponding technical solutions depart from the scope of the technical solutions of the embodiments of this application. Particularly, to the extent that no structural conflict exists, various technical features mentioned in different embodiments may be combined in any manner. This application is not limited to the specific embodiments disclosed herein, but includes all technical solutions falling within the scope of the claims.

What is claimed is:

1. A resin composition, comprising a main polymer and a crosslinking agent, wherein the crosslinking agent is represented by Formula (A), (B), or (C):

$$(HS)_{n_1}\text{-}L_1\text{-}Ar_1\text{-}L_1\text{-}(SH)_{n_1} \quad (A)$$

$$(HS)_{n_1}\text{-}Ar_1\text{-}(SH)_{n_1} \quad (B)$$

$$(HS)_{n_1}\text{-}Ar_1\text{-}L_1\text{-}(SH)_{n_1} \quad (C)$$

wherein, $Ar_1$ is an aromatic group containing 6 to 50 ring atoms, and each $L_1$ is independently selected from one or more of a $C_1$ to $C_{50}$ alkylene, or a dynamic covalent bond group;

each $n_1$ is independently selected from integers from 1 to 3; and a structural unit of the main polymer contains a structure represented by Formula (1), a structure represented by Formula (1A), a structure represented by Formula (1B), and/or a structure represented by Formula (1C), and the main polymer contains no aromatic group:

(1)

(1A)

(1B)

(1C)

wherein:
$R_1$ and $R_2$ each are one independently selected from a single bond, a substituted or unsubstituted $C_1$ to $C_{15}$ alkylene, a substituted or unsubstituted $C_2$ to $C_{15}$ alkenylene, or a substituted or unsubstituted $C_2$ to $C_{15}$ alkyl ether group;
$L_2$ is a substituted or unsubstituted $C_1$ to $C_{20}$ hydrocarbon group, and the hydrocarbon group contains an olefinic bond and/or an acetylenic bond; and
* is a linking site.

2. The resin composition according to claim 1, wherein:
a molar percent of the structural unit containing the structure represented by Formula (1), the structure represented by Formula (1A), the structure represented by Formula (1B), and/or the structure represented by Formula (1C) in the main polymer is not less than 2.5%; and/or
a number-average molecular weight of the main polymer is 2,000 to 2,000,000.

3. The resin composition according to claim 1, wherein a mass ratio of the crosslinking agent to the main polymer is (0.001 to 0.1):1.

4. The resin composition according to claim 1, wherein the main polymer contains at least one terminal olefinic bond or one terminal acetylenic bond.

5. The resin composition according to claim 1, wherein:

$R_1$ and $R_2$ each are independently $CR_3R_4$; and

$R_3$ and $R_4$ each are one or more independently selected from hydrogen, a substituted or unsubstituted $C_1$ to $C_{10}$ alkyl, halogen, an ester group, a carboxyl, a carboxyl salt group, a hydroxyl, an amino group, or a cyano group.

6. The resin composition according to claim 1, wherein the structural unit of the main polymer contains a structure represented by Formula (1-1), a structure represented by Formula (1-2), a structure represented by Formula (1-3), and/or a structure represented by Formula (1-4):

(1-1)

(1-2)

(1-3)

(1-4)

wherein:

each $R_5$ is one or more independently selected from hydrogen, a substituted or unsubstituted $C_1$ to $C_{10}$ alkyl, halogen, an ester group, a carboxyl, a carboxyl salt group, a hydroxyl, an amino group, or a cyano group; and

$R_6$ is selected from a substituted or unsubstituted $C_1$ to $C_{10}$ alkylene.

7. The resin composition according to claim 6, wherein:

each $R_5$ is independently selected from hydrogen, halogen, or an unsubstituted $C_1$ to $C_5$ alkyl; and/or

$R_6$ is selected from a single bond or a substituted or unsubstituted $C_1$ to $C_5$ alkylene.

8. The resin composition according to claim 6, wherein the main polymer further comprises a structural unit represented by Formula (2):

(2)

wherein each $R_7$ is one or more independently selected from hydrogen, halogen, an ester group, a carboxyl, a carboxyl salt group, a hydroxyl, an amino group, a cyano group, a substituted or unsubstituted $C_1$ to $C_5$ alkyl.

9. The resin composition according to claim 1, wherein $Ar_1$ is one selected from the following structures:

wherein:

Y is one selected from $CR_8$, O, S, or S=O;

each $X_1$ independently represents $CR_9$ or N, and not all $X_1$ symbols in a same structural formula represent N; and each $R_8$ and $R_9$ is independently selected from hydrogen or a substituted or unsubstituted $C_1$ to $C_{10}$ chain alkyl.

10. The resin composition according to claim 1, wherein a dynamic covalent bond in the dynamic covalent bond group is at least one selected from a borate ester bond, an acylhydrazone bond, or a bond formed by Diels-Alder reaction.

11. A binder, comprising the resin composition according to claim 1.

12. An electrode slurry, comprising;

a solvent; and the resin composition according to claim 1.

13. The electrode slurry according to claim 12, wherein, based on a total mass of the electrode slurry except the solvent, a mass percent of the resin composition is 1% to 10%.

14. An electrode plate, wherein the electrode plate comprises a current collector and an active layer carried on the current collector, and the active layer is prepared from a raw material comprising the resin composition according to claim 1.

15. A crosslinking resin, having a three-dimensional network structure formed by linking the main polymer and the crosslinking agent in the resin composition according to claim 1 through a crosslinking site, the crosslinking site comprises a carbon-sulfur single bond formed by an unsaturated bond in the main polymer and a thiol bond in the crosslinking agent, and the unsaturated bond is selected from an olefinic bond and/or an acetylenic bond.

16. An electrode plate, comprising:
    a current collector; and
    an active layer carried on the current collector and comprising the crosslinking resin according to claim 15.

17. A battery, comprising the electrode plate according to claim 16.

18. An electrical device, comprising the battery according to claim 17.

* * * * *